June 24, 1969  K. KIRCHHUBEL  3,451,747
APPARATUS FOR MEASURING AND RECORDING THE PUPILS OF THE EYES
Filed April 20, 1965  Sheet 2 of 2

INVENTOR
KURT KIRCHHUBEL

BY Watson, Cole,
Grindle & Watson
ATTORNEYS

United States Patent Office 3,451,747
Patented June 24, 1969

3,451,747
APPARATUS FOR MEASURING AND RECORDING
THE PUPILS OF THE EYES
Kurt Kirchhubel, Dutenhofen, kreis Wetzlar, Germany,
assignor to Oculus-Optikgerate G.m.b.H., Wetzlar,
Germany
Filed Apr. 20, 1965, Ser. No. 449,531
Claims priority, application Germany, Apr. 24, 1964,
O 10,104
Int. Cl. A61b 3/10
U.S. Cl. 351—5                                    4 Claims

ABSTRACT OF THE DISCLOSURE

A device for measuring and recording the position of the pupils of a prospective spectacle wearer on a measuring sheet having a frame with a support for the head of the wearer and a measuring sheet having a marking line with two rulers mounted parallel to the marking line. Adjustment means for the rulers and a marking stylus are provided with a system of mirrors on the frame.

---

This invention relates to a device for measuring and recording the position of the pupils of human eyes on a measurement sheet with a co-ordinate system, whose abscissa represents the centre line of the spectacle frame and whose ordinate defines the symmetry line of the spectacle frame. Based on a measurement sheet of this kind, the optical axes of the spectacle lenses can be so aligned that they coincide with the pupils of the prospective spectacle wearer with his head supported in a frame on the device. The known template discs appertaining to each spectacle frame may then be placed on the lenses, these discs having a contour corresponding to the lens mountings and having the centre-line of the spectacle frame marked on them. The lenses together with the template discs are then placed in an automatic grinder which grinds the spectacle lenses precisely according to the contour of the template discs. The template discs are so placed to this end, that their centre lines coincide with the abscissa and that correct distance from the ordinate is maintained.

The recording of the pupils on the measurement sheet, i.e. in the correct position relative to the said co-ordinate system, has been hitherto carried out on the basis of measurements which are taken by the optician with inadequate equipment, i.e. the accuracy of the recording depends more or less on the skill of the optician. For this reason, it has already been suggested that the eyes be photographed together with the spectacle frame, that the picture then be enlarged to scale, and that the spectacle lenses thereafter be aligned according to this picture. This method is time-consuming, costly and gives rise to errors.

The main object of the present invention is to provide a device by which the position of the pupils may be recorded in a simple manner and with great precision in the correct relationship with the co-ordinate system of the measurement sheet.

According to the present invention a device for measuring and recording the position of the pupils, of a prospective spectacle wearer, on a measurement sheet having a co-ordinate system whose abscissa represents the spectacle frame centre line which is marked on the template discs used for grinding the spectacle lenses, and whose ordinate indicates the symmetry line of the spectacle frame comprises a support for the wearer's head, measurement sheet carrier having a marking line for setting the abscissa of the measurement sheet, two rulers parallel to the marking line and adjustable to vary the distance between them symmetrically to the marking line, a marking stylus displaceable in the directions of the abscissa and ordinate of the measurement sheet, two cross hairs or reticles co-axial with each other and with the marking stylus, and a system of mirrors including a partially transparent mirror so arranged that the measurement sheet with the displaceable rulers on the one hand, and the cross hairs on the other hand, may be reflected into the spectacle frame, and that the spectacle frame and the eyes of the wearer of the spectacles may be observed through the partially transparent mirror.

A device of the invention has the advantage that the measurement sheet with its co-ordinate system may be reflected into the spectacle frame so that its abscissa coincides with the centre line of the spectacles. Once this setting of the measurement sheet is established with its ordinate alined on the middle of the spectacles, only the positions of the pupils need then be marked on the measurement sheet. Their position is then automatically correct in respect of the abscissa and ordinate of the measurement sheet.

In order that the invention may be more fully understood an embodiment in accordance therewith will now be described by way of example with reference to the accompanying drawings, in which.

Figure 1:
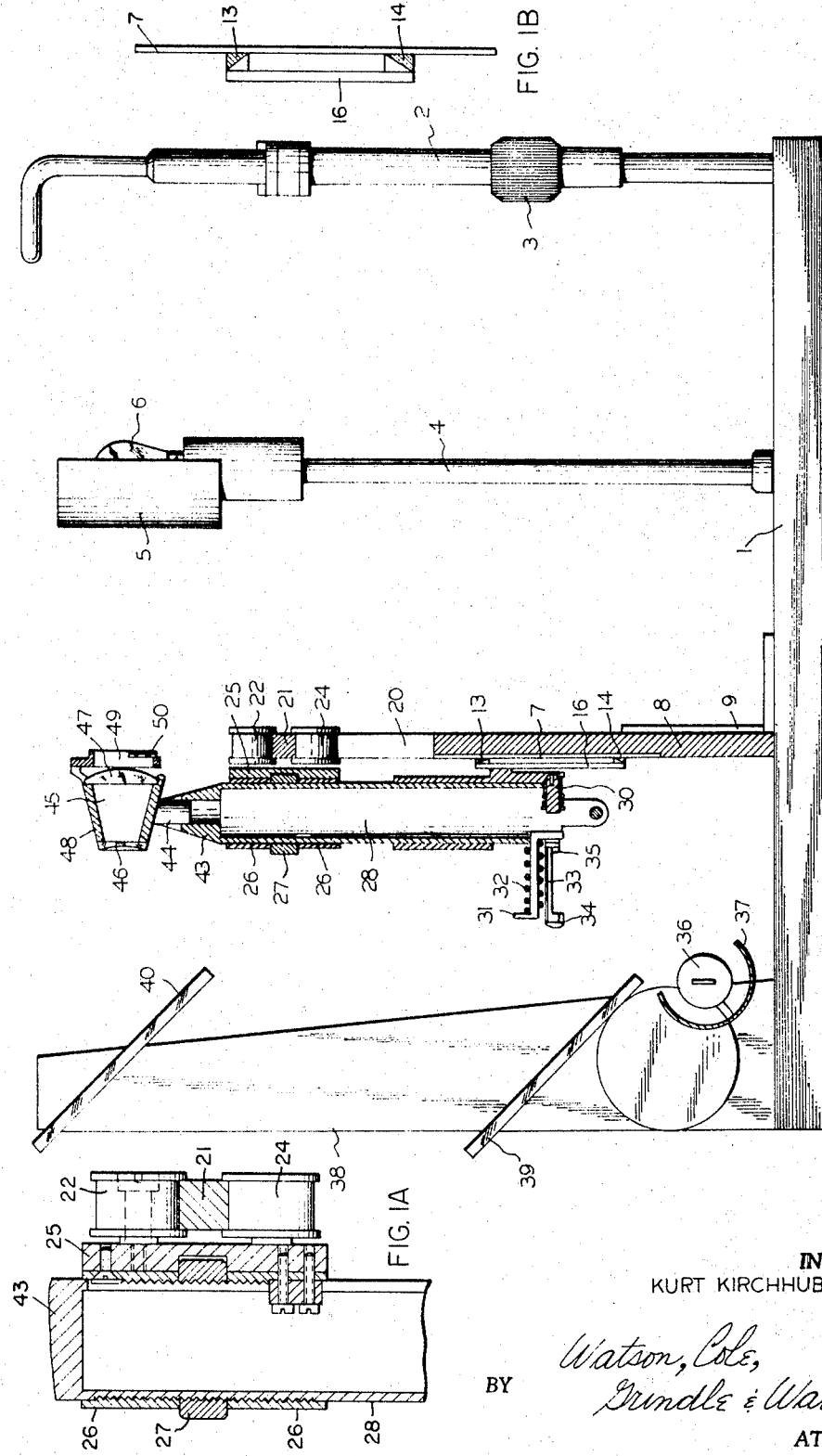
FIG. 1 is a side view partly in cross section of an optical apparatus.
Figure 2:
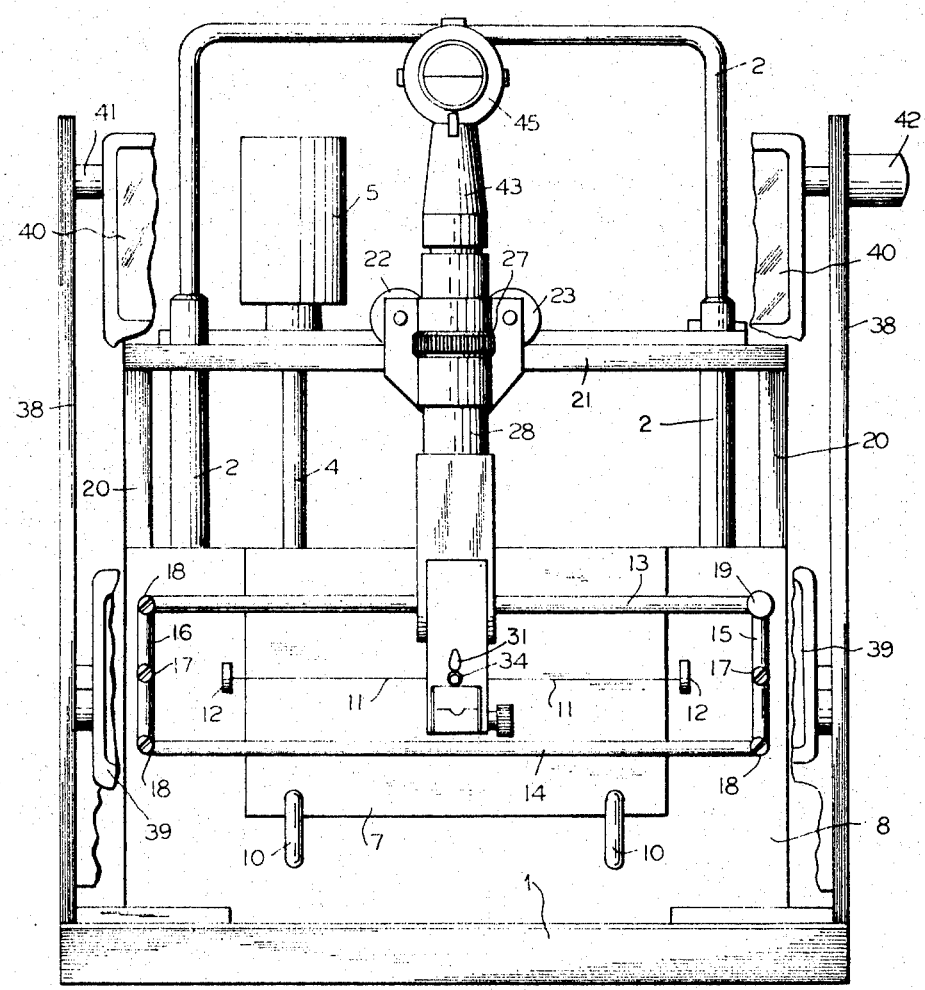
FIG. 2 is a rear view of the apparatus of FIG. 1, the mirrors being omitted; and, FIG. 3 is a detail of the apparatus to enlarged scale.

Referring to the drawings, the apparatus has a base plate 1 to the right-hand extremity of which are secured a vertically adjustable chin and forehead support 2. Adjustment of the support 2 is effected by a threaded nut 3. In front of the chin support 2 there is mounted, on a rod 4, an incandescent bulb 6, covered by a screen 5, which serves to illuminate the eyes of the user of the spectacles.

A panel 8 secured on the base plate 1 by a bracket 9 has a measurment sheet 7 securely held on it by two clips 10. A wire 11 is fastened on the same side of the panel 8 with clips 12 and the abscissa of the measurement sheet is made to coincide with this wire. The ordinate of the sheet is aligned according to the symmetry line of the spectacle frame in manner to be described hereinafter. On the rear side of the panel 8 there is also fastened a parallelogram linkage whose long rods 13 and 14 extend parallel to the wire 11 and whose short rods 15 and 16 are pivotally mounted on threaded pins 17 about the central points. The rods 13 to 16 of the parallelogram are connected to each other by joints 18 one of which is in the form of a handle 19 so that a swivelling movement of the handle 19 about the threaded pins 17 causes the distance between the rods 13 and 14 to vary, but these always remain parallel to the wire 11. As seen in FIG. 1, the rods 13 and 14 have a wedge-shaped, ruler-like cross section to form edges of optical sharpness.

Figure 3:
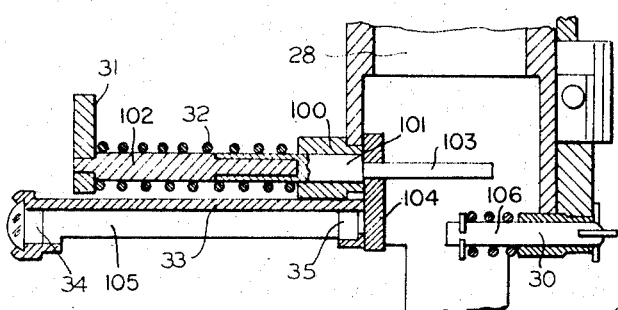

A rail 21 is mounted on bars 20 above the panel 8. Along this rail, a plate 25 runs on three rollers 22, 23, 24, which are secured thereon two tubular sections 26 being fastened on the plate 25. Between the two tubular sections is mounted an internally threaded nut 27 meshing with an externally threaded tube 28. At the bottom extremity of this tube, a marking stylus 30 is mounted, at right angles to the axis of the tube 28, which may be moved relative to the measurement sheet by a handle 31 loaded by a spring 32 (FIG. 3). A small tube 33 open at the bottom, in which are mounted two cross hairs 34 and 35, is secured on the tube 28 co-axially with the axis of the marking stylus. These cross hairs are illuminated by a bulb 36 FIG. 1, mounted in a reflector 37.

A bracket 38 is fastened on each side of the plate as seen at the left-hand extremity of the base plate 1 in FIG. 1. Between the two brackets there is firmly secured a mirror 39 disposed at 45° to the sighting line of the cross hairs 34, 35. A second, partially transparent mirror 40, is pivotably mounted in the brackets 38 above the mirror 39 on two pivot pins 41, 42. The pin 42 is guided in an elongated hole of the corresponding bracket 38. The pin 41 has a small play in its bracket 38, so that the mirror 40 may be pivoted about the axis of the pins 41, 42 and may also be tilted by a small amount at right angles to this axis.

The tube 28 is closed at the top by a head 43 having a bore and acting as a bearer for the pin 44 of a telescope 45 having lenses 46 and 47. A ring 49 is mounted on the case 48 of the telescope in front of the lens 47 and carries a mirror or a mark 50 for sighting the eyes.

The following procedure is followed to determine the pupillary positions on the measurement sheet:

As usual, a spectacle frame selected by the prospective wearer is initially fitted on him and adjusted. He then places his head, with the frame in place, in the chin support 2 whose height is adjusted by means of the nut 3.

The optician sits facing him, i.e. with the eyes behind the mirror 40. In the mirror, he sees the sighting line of the cross hairs 34, 35, and the measurement sheet 7 with the wire 11, the abscissa of the measurement sheet already being aligned with the wire 11. The tube 28 is so adjusted by the nut 27 that the sighting line intersects the abscissa of the measurement sheet. The optician then displaces the sheet 7, whose ordinate is visible in the mirror 40, laterally until the latter coincides with the symmetry line of the spectacle frame. The spectacle frame is visible to him through the mirror 40.

If it is assumed that the chin support and the prospective wearer are so adjusted in height that the centre line of the spectacle frame accidentally coincides with the sighting line of the cross hairs 34, 35 with the mirrors 39 and 40 set parallel with the image of the wire 11, the measurement may be carried out immediately. The tube 28 is displaced laterally until the sighting line lies in the same plane perpendicular to the base plate 1, as one eye of the prospective wearer. The nut 27 is then actuated to displace the tube 28 and thus the sighting line upwards or downwards until the latter coincides with the centre of the pupil of said eye. The optician sees the pupil in position above the top edge of the mirror 50. The prospective wearer of the spectacles directs his gaze and thus his pupil to this mirror. If the sighting line coincides with the centre of the pupil, the corresponding position is marked on the sheet 7 by depressing the handle 31. The same measurement is then carried out for the other eye. It has been assumed moreover that the centre line of the spectacle frame accidentally also lies parallel to the base plate 1.

Normally the chin support is set in such manner that the centre line of the spectacles does not coincide with the sighting line with parallel setting of the mirrors 39, 40. The centre line is not marked moreover on the spectacles frame. The centre line of the spectacles must therefore initially be brought into coincidence with the abscissa of the sheet 7, i.e. with the wire 11, by two simultaneous adjustments. On the one hand, the parallelogram 13 to 16 is adjusted by the handle 19 so that the inwards edges of the rods 13, 14 are set at such a distance as to become tangential to the spectacle rims, and the mirror 40 is pivoted at the same time so that tangency to the spectacle rims is actually established. Since the centre line of the spectacles has the same distance from the two lines tangent to the spectacle frame, the centre line of the spectacles will coincide with the abscissa of the measurement sheet 7. The pivotal movement of the mirror 40 required to effect this amounts to 1 to 2 degrees only, so that it does not affect the accuracy of measurement. Since the centre line of the spectacles does not as a rule lie parallel to the base plate 1 of the apparatus, the mirror 40 may at the same time be tipped at right angles to its axis, so that tangency of the edges of the rods 13 and 14 is produced even if the spectacle frames fit the wearer slightly askew. After this adjustment, the measurement is performed in the manner previously described.

Referring more specifically to FIG. 3, of the drawing, the tube 28 is provided with a bushing 100 in which a pin 101 is slidably mounted. A second pin 102 is provided on the pin 101 and as to both pins 101 and 102, these could be made integral with each other. The pin 102 carries a manual gripping member 31 and on the reduced portion 103 of the pin 101, there is provided a disk 104 and this disk when actuated by the member 31 will engage against the pin 30 with its marking point. The tube 33 is secured to the pipe 28 and this tube 33 is open at the bottom and carries a cross-member 34 at one end and also a cross-member 35 which can be considered as crosshairs and actually can consisit of glass plates. The axis of the cross-hairs is indicated in FIG. 3 by reference character 105 and it will be noted that the axes 105 and 106 are co-axial.

I claim:

1. A device for measuring and recording the position of the pupils of a prospective spectacle wearer on a measurement sheet having a co-ordinated system whose abscissa represents the spectacle base plate center line which is marked on template discs used for grinding the wearer's spectacle lenses, and whose ordinate indicates the symmetry line of the spectacle line, comprising a base plate, a support for the head of the wearer mounted in said base plate, a measurement sheet carrier vertically mounted upon said base plate lateral to and in a parallel relationship with said head support member, said base plate having a marking line thereon for setting the abscissa of the measurement sheet, two wedge-shaped rulers mounted to the inner face of said measurement sheet carrier in a parallel relationship to each other and to said marking line whereby said rulers are positioned on opposite sides of said marking line, means for physically cooperating one ruler to the other, means for adjusting the said rulers to vary the distance between them symmetrically relative to said marking line, a tube physically cooperating with said measurement sheet carrier, means for vertically orienting said tube in parallel relationship to said measurement sheet carrier and said head support means, means separate and distinct for moving said tube in a lateral and in a vertical direction respectively with respect to said measurement sheet carrier, a telescope mounted on one end of the tube whereby the examiner has a direct view of the patient's eyes undergoing examination, a marking stylus mounted on the other end of the tube displaceable with respect to said measurement sheet carrier in the direction of said abscissa and ordinate, two cross reticules mounted in said stylus and co-axial with each other and with said stylus, and a system of mirrors including a partially transparent mirror mounted on the base plate and arranged so that a measurement sheet supported by said measurement sheet carrier with said two rulers on the one hand and said cross-hairs on the other hand may be adjusted to reflect into the spectacle frame, and the spectacle frame and the eyes of the wearer's supported head observable through said partially transparent mirror and said telescope.

2. A device according to claim 1 wherein said partially transparent mirror is mounted in the base plate to pivot about its longitudinal axis and at the same time to be tippable at right angles to said longitudinal axis.

3. A device according to claim 1 wherein a marking stylus support is provided, and said marking stylus is movably mounted on said marking stylus support, a telescope is mounted on said support and a sighting point for the eye to be measured is secured in front of said support.

4. A device according to claim 1 wherein said rulers form the longitudinal two sides of a parallelogram whose other two sides have their centres swingingly mounted on said base plate.

References Cited

UNITED STATES PATENTS

| 2,325,569 | 7/1943 | Hancock et al. | 351—5 |
| 2,641,840 | 6/1953 | Garriss. | |

DAVID SCHONENBERG, *Primary Examiner.*
PAUL A. SACHER, *Assistant Examiner.*

U.S. Cl. X.R.

33—20